United States Patent
Mack et al.

(10) Patent No.: US 7,060,156 B2
(45) Date of Patent: *Jun. 13, 2006

(54) THREE-DIMENSIONAL SPACER FABRIC RESIN INTERLAMINAR INFUSION MEDIA PROCESS AND VACUUM-INDUCED REINFORCING COMPOSITE LAMINATE STRUCTURES

(75) Inventors: Patrick E. Mack, Milford, MA (US); Mitchell D. Smith, New London, CT (US)

(73) Assignee: VRAC, LLC, Norwell, MA (US)

( * ) Notice: Subject to any disclaimer, the term of this patent is extended or adjusted under 35 U.S.C. 154(b) by 116 days.

This patent is subject to a terminal disclaimer.

(21) Appl. No.: 10/335,894

(22) Filed: Jan. 3, 2003

(65) Prior Publication Data

US 2003/0102604 A1    Jun. 5, 2003

Related U.S. Application Data

(63) Continuation-in-part of application No. 10/172,053, filed on Jun. 17, 2002.

(60) Provisional application No. 60/307,109, filed on Jul. 23, 2001.

(51) Int. Cl.
*B29C 65/00* (2006.01)
*A61F 13/15* (2006.01)
*B32B 5/12* (2006.01)
*D04B 7/04* (2006.01)

(52) U.S. Cl. .................. 156/285; 156/161; 156/163; 428/111; 66/196

(58) Field of Classification Search ............. 428/313.3, 428/313.5, 315.9, 105, 109, 137, 178, 111, 428/86; 156/285, 161, 163; 66/196
See application file for complete search history.

(56) References Cited

U.S. PATENT DOCUMENTS

| | | | |
|---|---|---|---|
| 2,072,152 A | 3/1937 | Blake et al. | |
| 2,495,640 A | 1/1950 | Muskat | |
| 2,632,480 A | 3/1953 | MacIntyre | |
| 2,913,036 A | 11/1959 | Smith | |
| 3,013,588 A | 12/1961 | Klingberg | |
| 3,048,198 A | 8/1962 | Koppelman et al. | |
| 3,137,898 A | 6/1964 | Geringer | |
| 4,132,755 A | 1/1979 | Johnson | |
| 4,180,645 A | 12/1979 | Emmons et al. | |
| 4,238,437 A | 12/1980 | Rolston | |
| 4,307,155 A | 12/1981 | Broxterman et al. | |
| 4,311,661 A | 1/1982 | Palmer | |
| 4,312,829 A | 1/1982 | Fourcher | |
| 4,359,437 A | 11/1982 | le Comte | |
| 4,389,447 A | 6/1983 | Disselbeck et al. | |
| 4,404,319 A | 9/1983 | Gardner | |
| 4,622,091 A | 11/1986 | Letterman | |
| 4,759,893 A | 7/1988 | Krauter | |

(Continued)

FOREIGN PATENT DOCUMENTS

GB    1 432 333    4/1976

*Primary Examiner*—Terrel Morris
*Assistant Examiner*—Lynda Salvatore
(74) *Attorney, Agent, or Firm*—Brian M. Dingman, Esq.; Mirick, O'Connell, DeMallie & Lougee

(57) ABSTRACT

A three-dimensional spacer fabric resin interlaminar infusion medium and reinforcing composite lamina for use in the vacuum-induced manufacture of fiber reinforced polymer composites is described. This use of the three-dimensional spacer fabric as a composite interlaminar component improves both the vacuum-induced resin infusion flow rate and laminate quality control and aids in the achievement of enhanced resin uniformity distribution throughout the laminate.

17 Claims, 5 Drawing Sheets

U.S. PATENT DOCUMENTS

| | | |
|---|---|---|
| 4,840,828 A | 6/1989 | Böttger et al. |
| 4,873,044 A | 10/1989 | Epel |
| 4,886,442 A | 12/1989 | McCowin et al. |
| 4,902,215 A | 2/1990 | Seemann, III |
| 4,931,345 A | 6/1990 | Böttger et al. |
| 4,942,013 A | 7/1990 | Palmer et al. |
| 4,975,311 A | 12/1990 | Lindgren |
| 5,052,906 A | 10/1991 | Seemann |
| 5,175,034 A | 12/1992 | Andre De La Porte et al. |
| 5,240,533 A | 8/1993 | Böttger et al. |
| 5,271,982 A | 12/1993 | Verpoest et al. |
| 5,316,462 A | 5/1994 | Seemann |
| 5,369,183 A | 11/1994 | Okada et al. |
| 5,391,435 A | 2/1995 | Schutyser et al. |
| 5,420,216 A | 5/1995 | Guo et al. |
| 5,439,635 A | 8/1995 | Seemann |
| 5,480,697 A | 1/1996 | Böttger et al. |
| 5,526,767 A | 6/1996 | McGuiness et al. |
| 5,580,412 A | 12/1996 | Fantino |
| 5,588,392 A | 12/1996 | Bailey |
| 5,601,852 A | 2/1997 | Seemann |
| 5,684,086 A | 11/1997 | Yang et al. |
| 5,702,663 A | 12/1997 | Seemann |
| 5,721,034 A | 2/1998 | Seemann, III et al. |
| 5,874,503 A | 2/1999 | Scheibelhoffer et al. |
| 5,904,972 A | 5/1999 | Tunis, III et al. |
| 5,958,325 A | 9/1999 | Seemann, III et al. |
| 5,990,260 A | 11/1999 | Pettersson |
| 6,037,035 A | 3/2000 | Böttger |
| 6,238,679 B1 | 5/2001 | de la Poterie |
| 6,268,464 B1 | 7/2001 | Keinänen et al. |
| 6,287,745 B1 | 9/2001 | Yamamura et al. |
| 6,309,585 B1 | 10/2001 | Zheng |
| 6,372,201 B1 | 4/2002 | Leuridan et al. |
| 6,395,704 B1 | 5/2002 | Branlard et al. |

THREE-DIMENSIONAL SPACER FABRIC RESIN INTERLAMINAR INFUSION MEDIA PROCESS AND VACUUM-INDUCED REINFORCING COMPOSITE LAMINATE STRUCTURES

This specification is based on Provisional Patent Application No. 60/307,109, filed Jul. 23, 2001, and is a continuation in part of U.S. Ser. No. 10/172,053, filed Jun. 17, 2002, the entire disclosures of which are incorporated herein by reference.

BACKGROUND OF THE INVENTION

1. Field of the Invention

Fiber reinforced resin composite structures are used in the manufacture of parts and finished goods in a wide variety of applications, e.g., automotive, recreation vehicle, trucking, aerospace, marine, rail, appliance, athletic equipment, container, construction, anti-corrosion, electrical and medical industries. The present invention relates generally to open or closed molded resin infusion and resin transfer molding techniques for the production of fiber reinforced resin plastic (composite) structures in these and other industries.

More specifically it relates to and provides for the use of interlaminar three-dimensional spacer fabrics in vacuum-induced resin infusion and resin transfer molding processing of fiber reinforced plastics as part of or all of the composite laminate. The spacer fabric used according to this invention acts as an Interlaminar Infusion Medium that significantly improves the speed (by 200% to 400%), uniformity and ability to quality-control the transfer, delivery and distribution of a liquid matrix resin (plastic) throughout the laminate stack with utility far beyond any other product or process in prior art or on the market, as well as providing a reinforcing composite lamina that dramatically improves mechanical and structural properties in the finished composite part. Thereby, the manufacture of parts and finished goods is facilitated in a wide range of industries.

2. General Description of the Prior Art

Prior Art Open Molded Laminating Techniques

A typical open mold process for constructing composite parts generally includes the laying or placing of either dry fibers or previously resin-impregnated fibers (also known as "pre-pregs") into an open mold of a desired shape. Dry fiber reinforcements that have been saturated with liquid resin using manual surface-applied techniques such as hand wet-out or spray application (processes commonly referred to as hand/contact lay-up and spray lay-up, respectively), are then allowed to cure to form the composite product. Once placed in the open mold, pre-pregs are sometimes simply allowed to cure to form. When a flexible vacuum bag is applied to the part during the curing stage of these traditional open molding processes, ambient atmospheric pressure can provide an improvement in the consolidation of the laminate prior to curing. This modification is sometimes referred to as "wet-preg vacuum bagging".

Benefits and Drawbacks of Prior Art Open Molded Laminating Methods

Open mold processing has relatively low start-up and implementation costs for limited-run or custom part production. However, the problems associated with open mold processing include: high emissions of volatile organic compounds; uneven distribution of resin within the fiber structure often resulting in over-saturated and/or under-saturated areas; the formation of air voids and bubbles; and commonly the use of excess resin or waste of resin in the process. Furthermore, open molding unit production costs are relatively high due to the labor-intensive and limited throughput.

Prior Art Closed Molded Resin Infusion Techniques

In closed mold processing, fiber and/or other reinforcement structures, collectively referred to herein as the "pre-form," are cut to fit then placed in the mold. A method of enclosing and compressing the pre-form against and within the mold is then employed. Resin is introduced into the pre-form by entry ports through the enclosure. Following at least a partial curing of the resin, the enclosure is first removed, followed by the finished part. There are two principal closed molded resin infusion techniques commonly used to enclose and compress the pre-form against the mold, and to distribute resin through the pre-form, as follows:

Vacuum Infusion employs one generally rigid mold component and a flexible bag or membrane that when joined together are sealed to form a "closed" mold. Typically before applying the flexible bag or membrane a disposable barrier layer commonly referred to as a peel ply is placed on top of the pre-form. A peel ply allows resin to pass through it but will not stick to the ultimately cured resin. A disposable infusion medium and/or perforated injection tubing is then placed on top of the peel ply to aid in the delivery and distribution of the liquid resin down through the laminate stack. In the case of a reusable vacuum bag or membrane the distribution channels may be incorporated into the bag. Vacuum pressure is then applied and draws resin through feed-lines into the mold and through the fiber pre-form. This technique is commonly referred to as surface vacuum infusion processing since the resin is introduced at the top surface of the laminate assembly. Examples are described in Seeman et al. U.S. Pat Nos. 5,052,906, 4,902,215 and 5,601,852.

Resin Transfer Molding, on the other hand, employs two generally rigid mold components, that when mated together and sealed form an interior cavity into which liquid resin is introduced. The resin may be introduced either with or without the aid of vacuum or applied pressure.

Combinations and variations of vacuum infusion, resin transfer molding and other techniques can also be employed and are well known to those familiar with the state of the art of composite production.

Benefits and Drawbacks of Prior Art in Closed Molded Resin Infusion

A number of benefits can be derived through the use of vacuum infusion vis-à-vis open molding and resin transfer molding techniques. As compared to open molding, labor requirements can be reduced and the rate of production from each mold can be improved. For example, the labor involved in rolling out air bubbles and distributing the resin is reduced since the applied vacuum improves the distribution of resin throughout the pre-form. Vacuum infusion also helps to maintain more consistent resin-to-fiber ratios by providing the fabricator with the ability to control more precisely the resin input. Product quality and strength are improved since the vacuum removes trapped air and serves to insure tight bonding of all materials in the lay-up. Compared to resin transfer molding, vacuum infusion generally requires less set-up time and has much lower tooling costs. Additionally, resin transfer molding has the inherent risk of fiber washout or fiber movement/displacement due to resin flow, as well as resin racing or non-wetting in areas of complexity or varying part thickness.

The greatest drawback of surface vacuum infusion is the high waste and nonprofit stream costs in the disposal of peel plies and surface infusion media. Surface vacuum infusion also has an inherent risk of resin pooling in low-lying areas due to loss of vacuum pressure after the passage of the resin flow front.

In view of the foregoing disadvantages inherent in the known types of resin infusion techniques now present in the prior art, the present invention provides a new technique for resin infusion through the novel use of Three-Dimensional Spacer Fabric Interlaminar Infusion Media and Reinforcing Composite Lamina in the laminae.

The use of Three-Dimensional Spacer Fabric Interlaminar Infusion Media in a reinforcing composite lamina to aid in the transfer, delivery and distribution of resin according to the present invention substantially departs from the conventional concepts and designs of the prior art. In so doing, a technique and a material is provided for significantly increasing the resin distribution rate and uniformity throughout the laminae while also improving the mechanical properties of the finished cured product.

Object of the Invention

A basic object of the present invention is to provide for the three-dimensional spacer fabric interlaminar resin infusion media and in a reinforcing composite lamina that will overcome the shortcomings of the prior art methodology.

An object of the present invention is to provide three-dimensional spacer fabric interlaminar resin infusion media and reinforcing composite laminate structures for wide use in vacuum-induced resin infusion processes for composite manufacturing.

Another object is to provide for the use of three-dimensional spacer fabric resin infusion media and reinforcing composite lamina for the improvement of vacuum-induced resin infusion rates.

Another object is to provide three-dimensional spacer fabric resin infusion media and reinforcing composite lamina for improvement in the uniformity properties of vacuum-induced laminates.

Other objects and advantages of the present invention will be apparent from the following description, and when considered in conjunction with the accompanying drawings and claims for the scope of the present invention.

To the accomplishment of the above and related objects, this invention may be embodied in the form illustrated in the accompanying drawings, it being understood, however, that the drawings are illustrative only, and that changes may be made in the specific construction illustrated.

DETAILED DESCRIPTION OF THE INVENTION

This invention provides a novel application of the already known three-dimensional spacer fabrics existing in the textile industry. Such fabrics are generally comprised of two outer surface fabric layers lying in an X-Y plane but interconnected by more or less transversely extending "Z directional" resilient fibers or yarns. The outer surface fabric layers and Z directional resilient fiber component may be woven together, or otherwise attached, in such a way as to space apart the two outer surface fabric layers, generally having a free form or uncompressed thickness ranging more or less from as little as about 1 or 2 mm up to about 25 or 30 mm, or even more. Commonly, such spacer fabrics have preferred dimensions in the range of about 2 mm to about 12 mm.

This invention relates to use of such three-dimensional spacer fabrics as part of or all of the composite laminate for use in vacuum-induced resin infusion and resin transfer molding processing of fiber reinforced plastics. The spacer fabric used according to this invention acts both as an Interlaminar Infusion Medium with the capability of significantly improving the speed (e.g. by 200% to 400%, or more) of the transfer, delivery and distribution of the liquid matrix resin (plastic) throughout the laminate stack. At the same time, this innovation significantly improves the uniformity and ability to quality-control the composite product at levels well beyond any other product or process in prior art or on the market.

With the use of the spacer fabric as a reinforcing composite interlaminar infusion medium, according to this invention, both the mechanical and structural properties in the finished vacuum-formed composite part may also be improved, for instance by increasing the fiber-to-resin ratio to aerospace grade percentages of 70%+, significantly improving strength-to-weight ratio, as well as significantly improving shear strength, and damage tolerance. In effect, a "living hinge" can be created upon subsequent impact or flex failure of the composite. The invention may thus be applied to the manufacture of parts and finished goods in automotive, recreation vehicle, trucking, aerospace, marine, rail, appliance, athletic equipment, container, construction, anti-corrosion, electrical, medical and other yet-to-be identified industries.

The three dimensional spacer fabrics utilized in this invention are typically manufactured using machines that include, but are in no way limited to, single and double needle bar warp knitting machines as well as machines that employ the velour weave process and Raschel plush weave process as known in the art.

Figure 1:
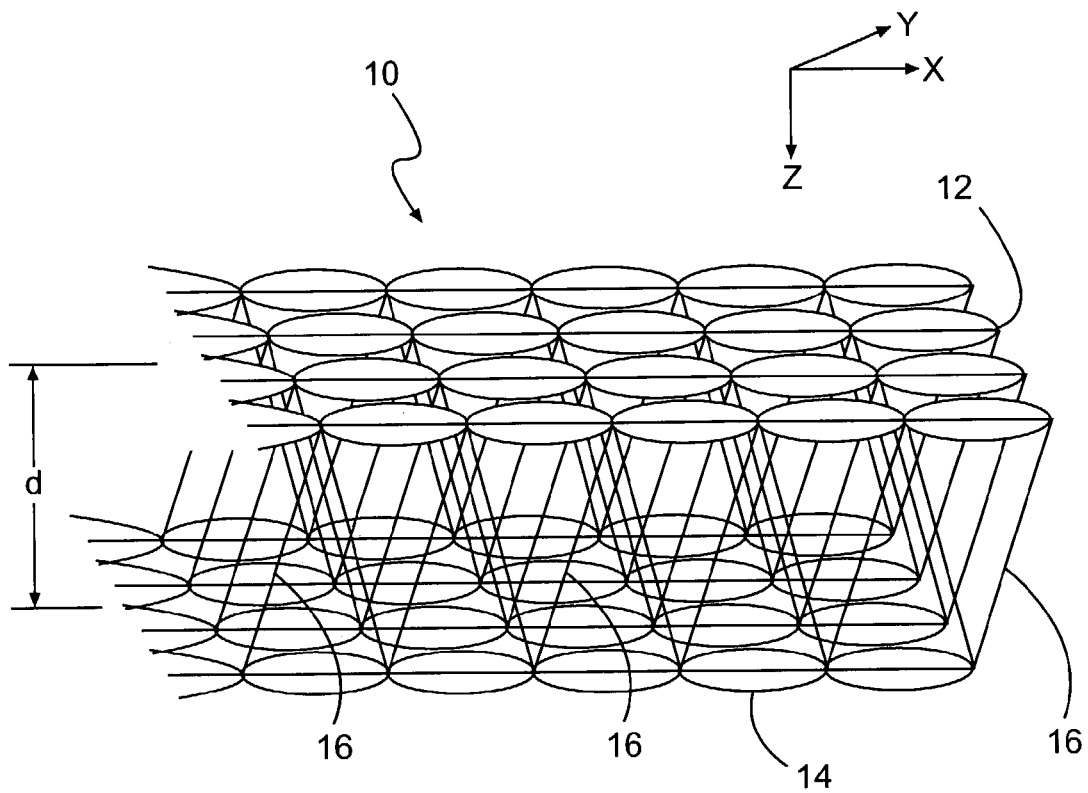
FIG. 1 is a schematic perspective view of a typical three dimensional spacer fabric.

Referring now to the drawings, FIG. 1 schematically illustrates the spacer fabric material 10 in a free or uncompressed relaxed form. As shown, in this illustration there are a pair of outer, generally woven fabric layers, 12 and 14, lying generally in the respective X-Y planes. Separating, and disposed between, these layers is a plurality of resilient fibers or yarns 16 lying generally in a "Z" direction. The Z direction fibers need not be at an exact 90° orientation, and generally are not. The specific angle Z is not critical and may vary substantially, for instance between about 30° and 90°.

Obviously, however, the more that the intermediate resilient fibers or yarns are normal to the planes of the outer layers 12 and 14 the more spatial dimension that can be achieved therebetween. As indicated, the overall thickness dimension "d" of the spacer fabric may most usefully be between about 1 or 2 mm up to about 25 or 30 mm, or even more, with presently preferred dimensions in the range of about 2 mm to about 12 mm.

As FIG. 1 also shows, the Z direction fibers lying between the two outer layers 12, 14. retain a free space in this intermediate region for (ultimately) a flow of resin therethrough. Frequently the fiber density for the "Z" fibers may be only a minor fraction of the fiber density of the outer layers 12, 14, but this may also vary according to the architecture and fiber population of the outer layers. That is the outer layers may range from an open honeycomb structure to a more tightly woven warp and weft structure.

Figure 2:
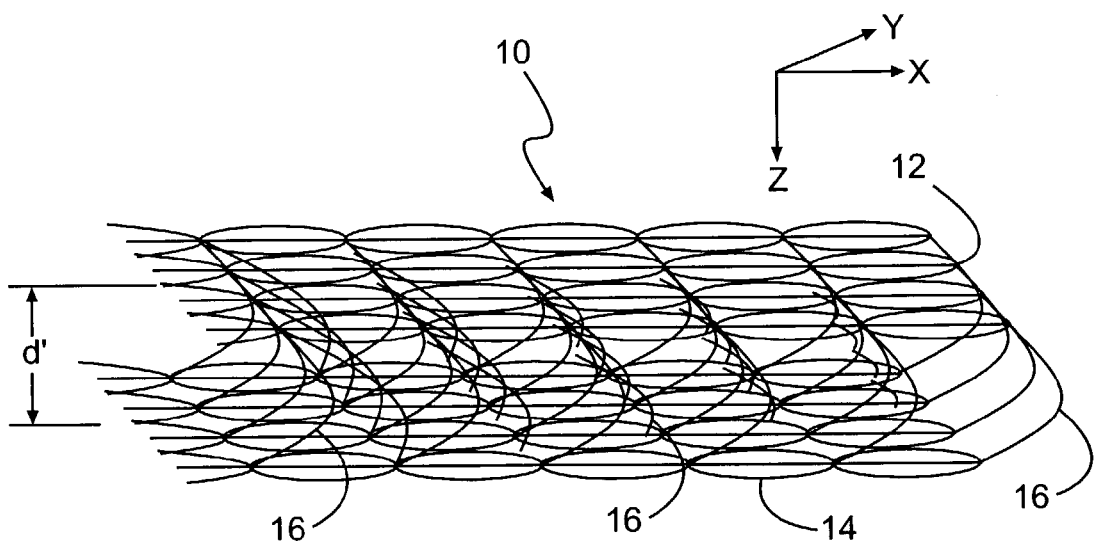
FIG. 2 is a schematic perspective view of similar to FIG. 1 but now in a loosely or partially compressed state with a vacuum applied.

FIG. 2 schematically represents how the three-dimensional spacer fabric 10 compresses in the Z direction under vacuum pressure to a lesser thickness d'. Even though compressed, there remains significantly and substantial open free paths for liquid resin flow. This feature provides and maintains, even under the vacuum induced compressive forces, an advantageous and sufficient mean free path within the three-dimensional spacer fabric architecture to facilitate the rapid resin flow, penetration and distribution throughout the structure including the surrounding and adjacent plies of the entire laminate layup. The liquid resin will have a flow path such that it not only fills the intermediate spaces between fibers 16 but also flows laterally so as to also fill and saturate both the outer layers 12, 14 as well as adjacent fabric layers, as will now be described and illustrated.

Figure 3:
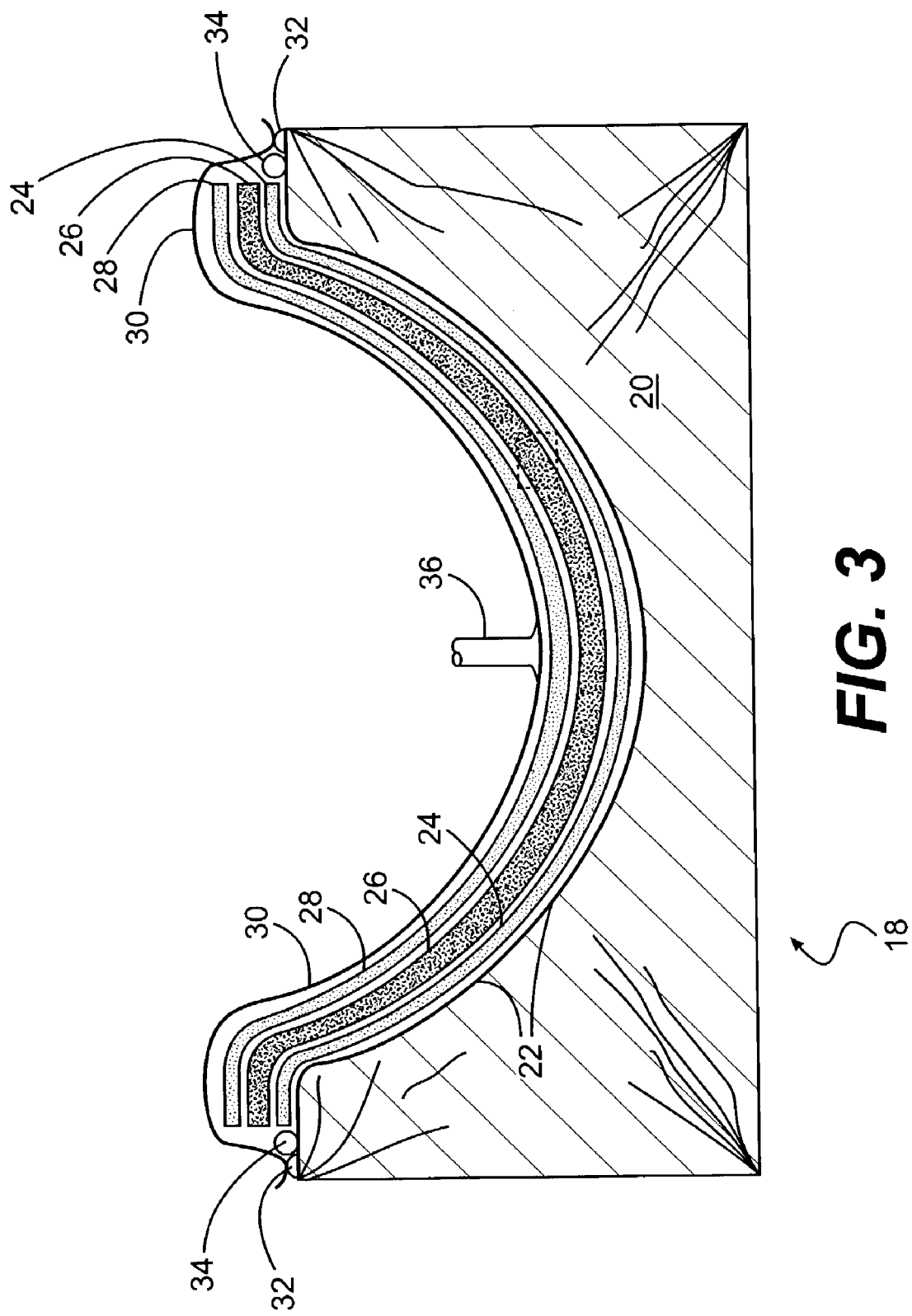
FIG. 3 is a schematic cross sectional view of a resin infusion assembly comprised of both a flexible membrane and a rigid mold.

FIG. 3 schematically represents a cross sectional view of a typical vacuum infusion mold assembly, 18. This assembly includes a rigid mold component 20 having a suitably-shaped mold face 22. A more or less relatively dense fibrous lamina 24 is applied adjacent and conforming to the mold face 22. Next the three-dimensional spacer fabric layer 26 is placed on the lamina 24, again generally conforming to the shape of the mold face 22. Finally, if so desired, an outer layer 28 of a fibrous lamina may be, and generally is, applied to make up the fibrous structure combination of the laminate. It will also be understood that the several fibrous layers 24, 26, 28, may be pre-assembled, for instance as by stitching, and applied to the mold face as more or less one unit.

Secured and sealed to the periphery of the mold face 22 is a substantially air-impervious flexible bag or plastic sheet 30, peripherally affixed with a sealing element, such as a tape, 32, effective to hold the applied vacuum. Within the vacuum bag enclosure 30 there is also placed one or more elements of perforated resin infusion tubing 34 arranged for delivery of the liquid resin. This tubing may be peripherally arranged with respect to the mold component 20. Alternatively, depending on the dimensions of the desired composite product, and possibly its complexity and shape as well, it may sufficient to have such tubing arranged along only one or more edges of the mold 18, or multiple tubings may be strategically placed as desired to secure a complete flow of resin into the laminate. Finally, a suitable device such as a tube 36 or the like is arranged for application of a vacuum. A plurality of such devices may again be strategically located and placed, as required, for larger-dimensioned composite products. Not shown are the additional conventional devices such as a reservoir from which the liquid resin is delivered to mold assembly, any pumps that might be required for resin delivery, and the vacuum applying apparatus elements, all of which are well-known to those skilled in the art of composite manufacture.

Figure 4:
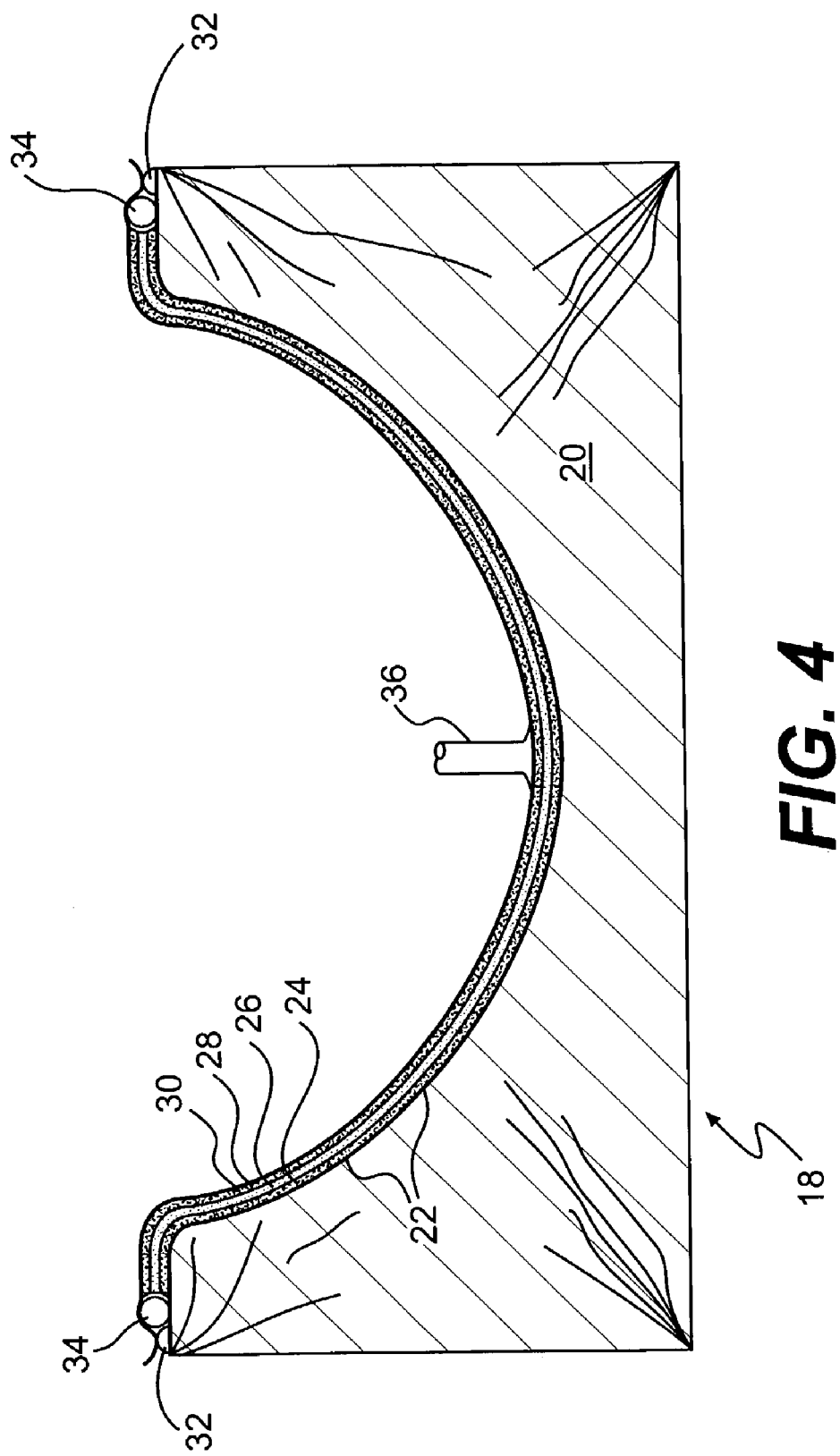
FIG. 4 is a schematic cross sectional view of FIG. 5 with vacuum applied.

In operation of the mold assembly 18, when all the above-described components FIG. 3 are assembled, and any required resin supply valve is opened, a vacuum is applied. As a result of the vacuum operation, the several fibrous layers of FIG. 3 are compressed to the configuration shown in FIG. 4. It will be understood that prior to application of the vacuum, the spacer fabric structure may have a configuration as illustrated in FIG. 1. After the application of the vacuum the configuration will have the appearance of FIG. 2 (although it is here shown in a more loosely compressed state to permit visualizing the detail of the structure). The vacuum serves to shape and collapse or compress the fibrous layers to the mold configuration and also provides consolidation of the fibers via negative atmospheric pressure, and with removal of any entrapped air, as shown in FIG. 4. Resin is introduced into the envelope via perforated feed-lines, and the vacuum serves to draw the resin through the fiber pre-form via the free open flow paths within the three-dimensional spacer fabric. It is presently preferred to use a spirally cut tubing wrap (see illustration in FIG. 7*a*) as element no. 34. Vacuum pressure is maintained until the laminate is fully saturated with resin. It is thereafter subsequently cured to form the composite product.

Figure 5:
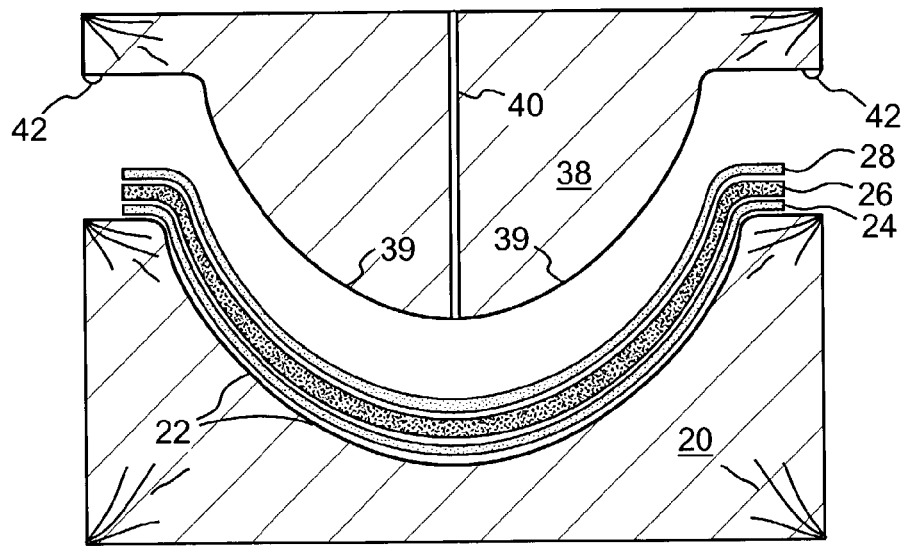
FIG. 5 is a schematic cross sectional view of one typical resin transfer molding assembly.
Figure 5A:
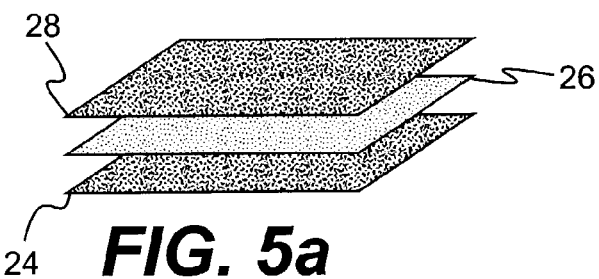
Figure 5B:
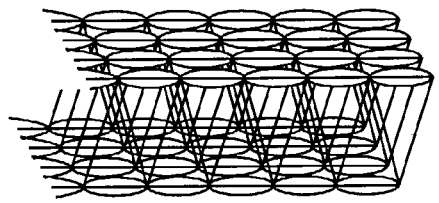

FIG. 5 is a cross sectional view of another embodiment of the invention. This figure illustrates a typical closed mold resin transfer molding assembly having two generally rigid mold components. Again, a three-dimensional spacer fabric infusion medium and reinforcing composite lamina is placed in the mold to form the laminate structure, or ply stacking sequence, much as illustrated in FIGS. 3 and 4. The components here are the base mold support structure 20, the mold face 22, a counter mold component 38 with its face 39, the resin inlet 40, the mold perimeter seal 42, and the fibrous laminae 24, 28, the three-dimensional spacer fabric 26 as illustrated in FIG. 3. Fibrous elements 24, 28 may be the same or different, both as to fiber content, related or additional materials, and as to denier or fiber weight and density, as desired for the resulting product characteristics. Included with FIG. 5 are two smaller figures, 5*a* showing a flat layered assembly of the composite components, and 5*b* corresponding to the illustration in FIG. 1.

Figure 6:
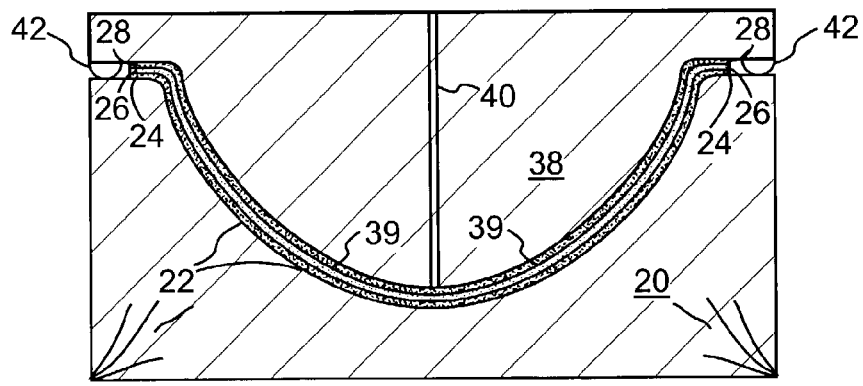
FIG. 6 is a schematic cross sectional view of FIG. 3 with pressure applied.
Figure 6A:

FIG. 6 is a schematic illustration of the assembled closed mold of FIG. 5 with the seal 42 engaging the periphery of the mold face 22. Here, with vacuum applied, the spacer fabric element is in a compressed form as schematically shown in the small FIG. 6*a*, corresponding to FIG. 2, but still with a sufficiently relatively open structure that permits the flow of resin therethrough.

Figure 7:
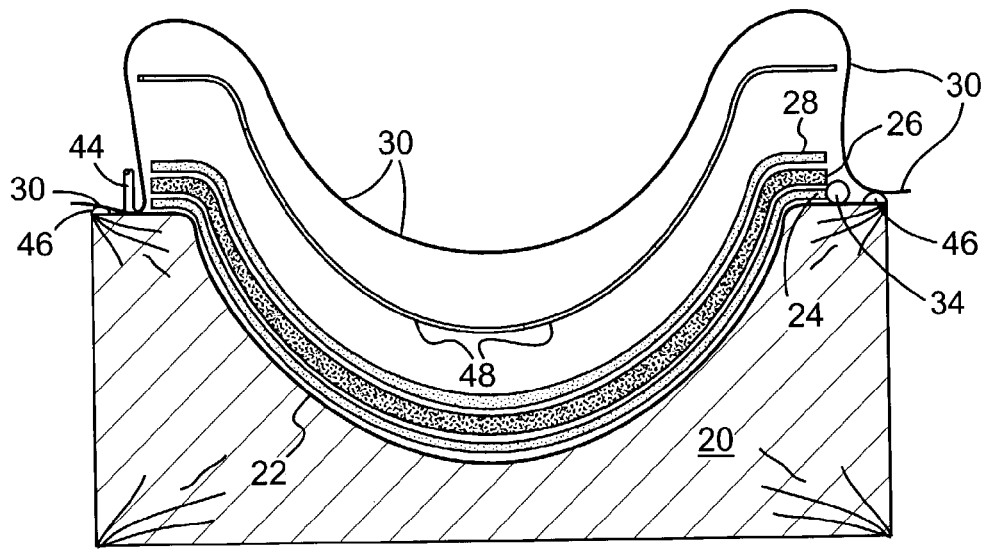
FIG. 7 is a schematic cross sectional view of a combination resin infusion assembly comprised of both a flexible membrane and a counter mold.
Figure 7A:
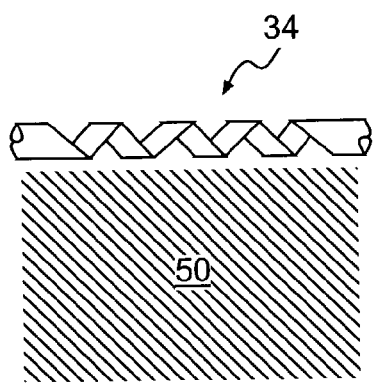

FIG. 7 is a schematic cross sectional view of another embodiment of the invention. In this figure a combination resin infusion assembly is comprised of both a flexible membrane and a counter mold. The components illustrated are the mold support structure 18, the mold body 20, the mold face 22, the vacuum bag 30, the perforated resin infusion tubing 34, the fibrous lamina 24, 28, the three-dimensional spacer fabric 26, the vacuum tubing 44, the sealant tape 46, and the counter mold 48. A preferred embodiment of the tape 34 in spirally cut form (slightly extended for clarity) is shown in FIG. 7*a*, adjacent a schematic partial plan view of the composite laminate assembly 50.

Figure 8:
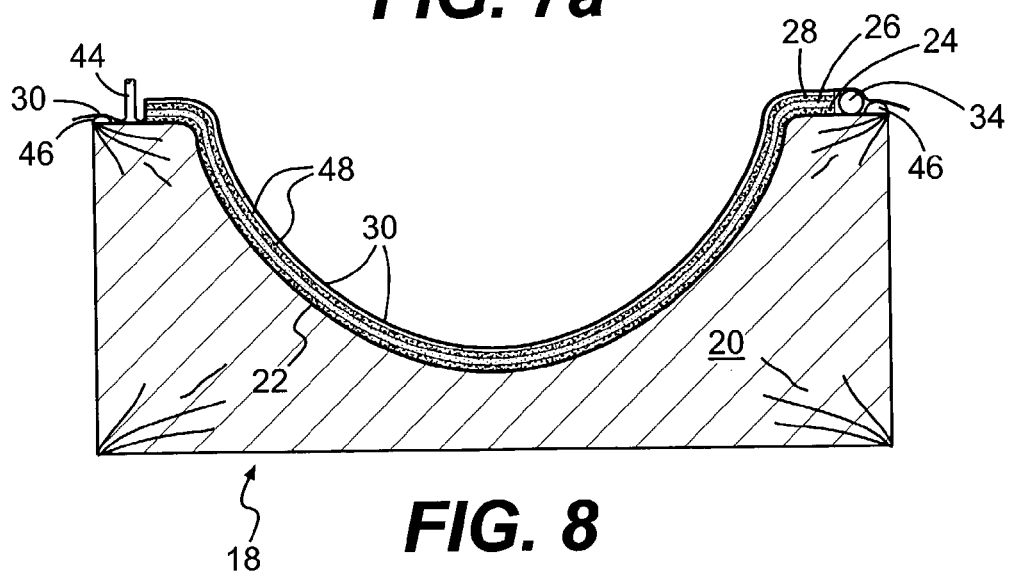
FIG. 8 is a schematic cross sectional view of FIG. 7 with vacuum applied.

FIG. 8 is a cross sectional view of FIG. 7 with vacuum applied, and is a representation of the three-dimensional spacer fabric under pressure.

The three-dimensional spacer fabrics utilized in this invention can be constructed uniformly or with many combinations of woven or non-woven structure and with a wide range of, as desired, fabric and yarn fiber types, such as monofilament or multifilament, and may comprise polyester, fiberglass, aramid, polyolefin, carbon, etc.

This invention also embraces the use of three dimensional spacer fabric interlaminar infusion media and reinforcing composite lamina stitched or bonded to either or both sides of traditional fibrous lamina materials such as fiberglass mat and roving. Three dimensional spacer fabric interlaminar infusion media and reinforcing composite lamina that are stitched or otherwise fastened to and/or around other materials are also included. This provides for the capability to produce pre-designed, "out-of-the-box" laminates that could further reduce manufacturing time while also helping to prevent fiber washout or movement/displacement in resin transfer molding process.

Overall, this invention provides and permits the achievement of a fiber reinforced polymer composite, that enables fabrication with increased resin infusion rates and improved product uniformity through improved resin diffusion uniformity. Improved speed and uniformity of resin distribution within the laminate leads to improved the mechanical properties of the composite part. This eliminates the need for using surface distribution media that require removal and disposal after the completion of the infusion process. Furthermore, surface resin infusion is a one-sided process in which the resin flows from the top down through the laminate stack. As both an interlaminar infusion medium and a reinforcing composite lamina, the three-dimensional spacer fabric can be sandwiched in the middle and/or placed on either or both ends of the laminate schedule, or ply stacking sequence, to promote rapid and uniform distribution on all sides of the dry laminate. Again, this greatly speeds infusion and improves composite part quality. The use of three-dimensional spacer fabric resin infusion media and reinforcing composite lamina can also assist, if so desired, in increasing laminate thickness, including the use of a plurality of such layers in the composite structure.

Much improved visual quality control can be achieved because the resin flow front line can seen through the commonly transparent or translucent vacuum bag, as well as its penetration through the laminate stack.

The choice of resin materials useful in the practice of this invention is not critical and will be selected according to the properties desired in the final product. They are typically well-known and commercially available, including polyesters, polyepoxides, polyurethanes, etc. They may suitably be employed either as liquid monomers or pre-polymers or oligomers of modest molecular weight. In general, such resins will become substantially cross-linked upon curing and be of the thermoset class of cured resins.

Vacuum infusion processing according to the present invention exhibits certain unique characteristics that are important to understand when selecting resin infusion media. Under sealed vacuum, a negative pressure exists on all sides of the dry laminate. When the resin injection point is opened, a difference in pressure is created between the vacuum port and the injection port. This pressure differential induces the resin to begin flowing through the dry laminate. As resin is pulled forward through the dry laminate, the vacuum pressure is maintained only at the resin flow front, i.e., the interface between the resin and the dry laminate; the saturated area behind the resin flow front returns to atmospheric pressure, and the resilient Z fibers will spring back. The effective force pulling the liquid resin through the dry laminate is therefore a function of the cross sectional area at the resin flow front. The greater the open cross sectional area the more force exerted, as force is a function of pressure multiplied by area.

Viscosity is a measurement of rate at which a fluid will flow against a stationary surface, that is, the resistance of a fluid flowing against a surface. Higher viscosity fluids exhibit greater resistance to flow than lower viscosity fluids. Any obstacle that fluid must travel around during its flow increases the effective area of stationary surface resistance, and decreases the effective open cross sectional flow area, and therefore decreases the overall fluid flow rate. Generally the denser and less uniform the Z fiber layer; the better it may be as a reinforcement material for composites. Vacuum infusing standard fibrous laminae is therefore quite challenging without the use of suitable interlaminar infusion media, as provided by this invention. The ideal infusion medium would maximize the available open cross sectional area while also presenting minimized flow restrictions.

This intuitive conclusion is the basis for the design of virtually all "static" three-dimensional resin infusion media. The problem, however, is that the resin must pass incrementally more stationary surface area as the required infusion distance is increased. Thus "length losses" accumulate as resin travels ever more slowly through the flow medium while encountering approximately the same frequency of restrictive fiber obstacles, which serve as the structural support to maintain maximum available cross sectional area under vacuum pressure. The inventors believe that this is the primary reason why interlaminar infusion, or infusion from within the laminate schedule, has achieved little adoption in the prior art despite being naturally advantageous as compared to surface infusion techniques like SCRIMP™, from cost, waste and property-additive standpoints.

That is, surface infusion is a unidirectional process in which resin flows from the top (or an exterior surface) down through the laminate stack. Disposable resin infusion media with rigid open structures that do not buckle under vacuum are placed under the vacuum bag on top of a "peel ply" that prevents them from sticking to the cured laminate. The mold is then "flooded" with resin and natural fiber wicking and vacuum pressure are relied upon to saturate the dry laminae beneath. In addition to the cost and waste of the disposable flow medium and peel ply, an additional problem with surface infusion is that there is no way to visually inspect the bottom laminae plies because the surface flow front precedes the flow front in the underlying laminae.

On the other hand, interlaminar infusion spacer fabric media according to this invention can be sandwiched and/or placed on either face to promote infusion on all sides of the dry laminate, which greatly speeds infusion. Furthermore, this interlaminar infusion media can increase laminate thickness and also allow for better visual quality control because the resin flow front line that is seen through the vacuum bag has come up through the laminate. The practice of the present invention overcomes such problems as incomplete or slow infusion, uneven distribution or pooling of resin, long set-up time, material waste, and weakened strength in the finished composite. It also enables closed-mold processing techniques that, as a practical matter, were not previously feasible for many products due to high production and quality requirements.

The choice of Z direction fibers can be widely varied and the selection thereof is influenced by the mechanical characteristics of the fiber material. These fibers may in general be of the same nature as those employed for the outer surface fabric layers, although carbon fibers are generally not preferred due to their inherent brittleness while resiliency and an appropriate bending modulus are the desired characteristics for this element. The Z fibers act essentially as supporting columns spacing apart the outer fabric layers. Therefore, important factors to consider for this selection include a balanced combination of column length, column diameter (or denier), column spacing and column orientation to the outer planar faces.

In operation, the present invention provides an interlaminar infusion medium spacer fabric comprised of two parallel "X/Y" planes of fiber fascia that are separated to a more or less consistent "free form" thickness by the separated columns of Z-directional resilient yarns. As illustrated in the drawings, application of vacuum pressure causes the Z columns to buckle or collapse compressing the material but still maintaining sufficient mean free path (for instance, on average about 50 to 80%) to promote rapid resin infusion. A critical advantage, however, is that as the negative or vacuum pressure relents behind the resin flow front line, the resilient Z fiber columns spring back. This feature creates a large resin-rich area behind the leading resin flow front line to feed further resin flow and minimizes the length losses that otherwise cripple other infusion media, thereby vastly improving the overall speed and uniformity of the resin infusion. Lastly, once the appropriate, desired amount of resin has been drawn into the part to be fabricated, the injection port is closed. This now eliminates the pressure differential and returns a negative pressure to all sides of the infused laminate. This backpressure substantially re-collapses the Z sprung columns, further uniformly distributes resin to all areas of the part and may increase the overall fiber-to-resin ratio for a stronger composite.

The inventors believe that the fiber architecture thereby achieved according to the present invention is the optimal embodiment for vacuum-induced resin infusion processing. For the first time, it is now possible to achieve reliable interlaminar infusion at high rates of production for large and/or complex parts with superior consistency and quality. Because it is an engineered material that becomes a constituent part of the finished composite, the practice of this invention can greatly enhance final performance-to-weight properties such as shear strength, rigidity and damage tolerance. These resulting architectures can now be engineered to provide a wide range of infusion rates, as desired, by changing the composition, density, diameter and/or height of the Z-directional fibers. A vast spectrum of physical property enhancements can be further tailored by designing X/Y/Z fiber architectures with hybrid combinations of polyester, glass, carbon, aramid, polyolefin, and/or other materials. The practice of this invention may also provide a relatively low-profile material, and tends to print through far less than most other composite materials.

This invention also contemplates hard tooling embodiments wherein an internal inflatable bladder may be used, in which case the processing parameter for compression of the spacer fabric may be greater than ambient atmospheric pressure. The fabric design is then based on the available pressure for collapsing the fabric with spring back provided by the use of the resilient Z fibers.

For any given pressure and the selected Z direction material, the required packing density is dependent upon the diameter and the length of the Z directional columns. By varying the length and diameter of the columns the required packing density may fluctuate. For any selected length and fiber component, the packing density then becomes dependent upon the diameter of column with a higher fiber density required for smaller diameter columns. It is thus also possible to use a shorter fiber column and decrease the column diameter while maintaining the collapsed thickness.

In one aspect of this invention, the fabric is constructed of small diameter monofilament polyester in the Z direction and with fiberglass yarn on the X/Y fascia planes; both are relatively low-cost materials. A reduced diameter and/or stiffness in the Z directional yarn or fiber may require reduced columnar height, and therefore a less free-form thickness of the fiber, to ensure adequate buckling yield and resilient spring-back behind the resin flow front. Despite the reduced free-form thickness, this embodiment may add the same overall thickness to the consolidated laminate as thicker free-form designs.

In another embodiment of this invention, the inventors have developed a low-cost product that is manufactured in a slightly different manner in that its fascias are woven instead of knitted. The woven architecture provides improved mechanical properties because the fibers are oriented in a preferred direction for strength in the laminate. The intent of this material is to reduce or eliminate the need for additional reinforcement materials in a given laminate and increase overall cost savings. The invention also contemplates a fabric design, which presents another low-cost material. This product has a similar Z directional structure, but with smooth faces. The X/Y faces are knitted with multifilament polyester thermoplastics ("PET") with tight face architectures. Smooth faces will help mitigate surface profiling, also known as print. This embodiment also provides an opportunity to use low-cost recycled PET for the multifilament components.

To those familiar with the art of composites fabrication, a first question might well be whether the interlaminar infusion media provided by this invention differs from the so-called SCRIMP™ technology. SCRIMP™ technology relates to the combined use of core materials with certain resin flow features (flow media) and reusable vacuum bags with resin feeds and distribution networks (a process provision). SCRIMP™, an acronym for Seemann Composites Resin Infusion Molding Process, sets the current benchmark for the state of the art with regard to infusion processing. SCRIMP™ technology is premised on the controlled flow of resin through an in-plane distribution system, which allows the through-the-ply stack thickness (out of plane) infusion of a dry laminate stack. The method of distribution ranges from that of the foundational patents, U.S. Pat. No. 4,902,215 and U.S. Pat. No. 5,052,906, issued to William H. Seemann, which specifically address the use of a flow medium fed by a "pervious conduit" (a resin feed or channel) communicating with the flow medium, to combined use of core materials with resin flow features and reusable vacuum bags with integral resin feeds and distribution networks, as taught in successive patents.

The current state of the prior art in the application of three-dimensional spacer fabric architecture as a composite lamina does not appear to suggest or imply the application and benefits of the use of three dimensional spacer fabrics as reinforcing interlaminar infusion media in accordance with the present invention. That is, nothing appears that either suggests or implies the application and benefits of the use of three dimensional spacer fabrics as reinforcing interlaminar infusion media in vacuum-induced molding techniques.

What is extant in the prior art concerns the art of manufacturing (weaving) and application in composite fabrication of three-dimensional fiber architectures as "integrated sandwich structures." Integrated sandwich structures are defined by use of a three-dimensional spacer reinforcing architecture wherein two parallel planar reinforcements are integrally woven together by means of vertical pile threads. These reinforcements are typically constructed of multi-filament fiberglass strands. Upon impregnation with a thermoset resin, capillary forces wet the vertical pile threads making the two planar reinforcements separate directly, evenly and autonomously until the height preset by the vertical pile thread length is reached. The resulting interstitial space between the planar reinforcements can impart a number of desired properties to the composite such as increased strength, stiffness, and insulating properties.

The three-dimensional fabrics described by these prior patents consist of two fabric layers connected by intermediate fibers to define a plurality of voids in the space between the first and second layers and therefore form a three-dimensional woven fabric structure. Relevant patents have been issued to, and the three-dimensional fibers are commercially available from, Gamma Holding Nederland N. V. of Helmond, Netherlands (see, http://www.gammaholding.nl/parabeam/index.htm) and Vorwerk & Co. Mobelstoffwerke GmbH & Co. K G of Kulmbach, Germany.

Furthermore, the prior art as described in U.S. Pat. Nos. 5,240,533, 5,480,697, and 6,037,035 clearly demonstrate that the intended application of the current art is limited to its use as an "integrated sandwich structure". The patents and supporting literature either provide for a means of manufacturing (weaving) the "integrated sandwich structure" so as to optimize the structures ability to maintain x and y fiber plane separation during composite processing, or are application specific.

The present invention is premised on the application of spacer fabrics as the reinforcing interlaminar infusion media, in an application whereby the spacer fabric is initially collapsed under ambient atmospheric pressure (via the vacuum). Thus, the intent here is not to provide an "integrated sandwich structure", but rather, a means by which resin can more freely flow within and laterally through the composite, with the added benefit of imparting additional structural properties on the basis of its fiber architecture. Furthermore, the resulting cross section of the spacer fabric within the composite laminate is resin filled. In these respects the application of the present invention is opposite that of the current state of the art. On this basis the present invention for the use of spacer fabrics as reinforcing interlaminar infusion media presents utilities in use far beyond any other product or process in prior art or available on the market.

It is to be understood that the invention is not limited in its application to the details of construction and to the arrangements of the components set forth in the foregoing description or as illustrated in the drawings. The invention is capable of other embodiments and of being practiced and carried out in various ways. With respect to the above description then, it is to be recognized that the optimum dimensional relationships for the parts of the invention, to include variations in size, materials, shape, form, function and manner of operation, assembly and use, will be readily apparent to those skilled in the art, with minimum initial trial and error experimentation to achieve optimum results. All equivalent relationships to those illustrated in the drawings and described in the specification are intended to be encompassed by the present invention.

Accordingly, the exclusivity right to be protected by this invention is limited only by the spirit and scope of the following claims.

The invention of claimed is:

1. A method for the vacuum-induced fabrication of reinforced plastic composites comprising:

assembling a fiber structure including a three-dimensional fibrous spacer fabric employed as an interlamina infusion medium, said fabric having at least first and second outer substantially fibrous layer surfaces composed of fibers or yarns, each of said outer layers being generally oriented in an X–Y plane, said spacer fabric having between its outer layers an intermediate spacer layer composed of spacer fibers or yarns oriented in a generally transverse direction with respect to said X–Y planes of said outer layers, juxtapositioning said spacer fabric with respect to at least one mold surface of a desired shape and configuration, forming an assembly comprising a substantially gas impervious cover sheet substantially enclosing said fabric, applying a negative pressure to said assembly, which collapses said spacer fabric, introducing a liquid resin flow within and into said collapsed spacer fabric while under negative pressure, continuing said resin flow to said collapsed spacer fabric so as to substantially fully saturate said spacer fabric with resin, terminating the resin flow, and thereafter allowing the resin to cure, with said spacer fabric in the collapsed state.

2. The method of claim 1 wherein said fiber structure further comprises at least one additional fibrous layer on at least one of said outer surfaces of said spacer fabric.

3. The method of claim 1 wherein said fiber structure further comprises at least one additional fibrous layer on each of said outer surfaces of said spacer fabric.

4. The method of claim 2 wherein said spacer fabric and said at least one additional fibrous layer are assembled together by stitching or knitting.

5. The method of claim 3 wherein said spacer fabric and said additional fibrous layers are assembled together by stitching or knitting.

6. The method of any one of claims 1, 2, 3, 4, or 5 wherein said spacer fabric has an initial thickness of from about 2 mm to about 25 mm.

7. The method of claim 1 wherein said negative pressure is applied at a first location of said assembly, and said resin flow is introduced to a different, second location of said assembly, and wherein said resin flows from said first location toward said second location, so as to gradually saturate said spacer fabric with resin.

8. The method of claim 7 wherein said fiber structure further comprises at least one additional fibrous layer on at least one of said outer surfaces of said spacer fabric.

9. The method of claim 7 wherein said fiber structure further comprises at least one additional fibrous layer on each of said outer surfaces of said spacer fabric.

10. The method of claim 8 wherein said spacer fabric and said at least one additional fibrous layer are assembled together by stitching or knitting.

11. The method of claim 9 wherein said spacer fabric and said additional fibrous layers are assembled together by stitching or knitting.

12. The method of any one of claims 7, 8, 9, 10 or 11 wherein said spacer fabric has an initial thickness of from about 2 mm to about 25 mm.

13. The method of any one of claims 1 or 7 wherein said spacer fabric outer fibrous layers are at least in part composed of polyester, polyolefin, glass or carbon fibers, or mixtures thereof.

14. The method of any one of claims 1 or 7 wherein the said resilient spacer fibers are at least in part composed of polyester, polyolefin, or glass fibers, or mixtures thereof.

15. The method of claims 2 or 3 wherein said additional fibrous layers are composed of polyester, polyolefin, glass or carbon fibers, or mixtures thereof.

16. The method of claims 8 or 9 wherein said additional fibrous layers are composed of polyester, polyolefin, glass or carbon fibers, or mixtures thereof.

17. A vacuum-infused product as produced by the process of any of claims 1, 2, 3, 4, 7, 8, 9, 10 or 11.

* * * * *

UNITED STATES PATENT AND TRADEMARK OFFICE
CERTIFICATE OF CORRECTION

| | |
|---|---|
| PATENT NO. | : 7,060,156 B2 |
| APPLICATION NO. | : 10/335894 |
| DATED | : June 13, 2006 |
| INVENTOR(S) | : Patrick E. Mack and Mitchell D. Smith |

Page 1 of 1

It is certified that error appears in the above-identified patent and that said Letters Patent is hereby corrected as shown below:

Column 12, line 47 claim 7, that portion of the claim reading "first" should be changed to --second--;
Column 12, line 48 claim 7, that portion of the claim reading "second" should be changed to --first--.

Signed and Sealed this

Third Day of August, 2010

David J. Kappos
*Director of the United States Patent and Trademark Office*